United States Patent [19]

Craig

[11] Patent Number: 5,347,947

[45] Date of Patent: Sep. 20, 1994

[54] APPARATUS FOR CONTROLLING AIRCRAFT ON SHIPS OR THE LIKE

[76] Inventor: Thomas M. Craig, "Belmont", Loanhead, Midlothian, United Kingdom, EH2O 9SD

[21] Appl. No.: 103,833

[22] Filed: Aug. 9, 1993

Related U.S. Application Data

[63] Continuation of Ser. No. 699,845, May 14, 1991, abandoned.

[51] Int. Cl.⁵ .............................................. B64F 1/22
[52] U.S. Cl. ..................................... 114/261; 244/115
[58] Field of Search ................ 244/115, 116; 114/261, 114/75; 414/137.2; 280/508

[56] References Cited

U.S. PATENT DOCUMENTS

| | | | |
|---|---|---|---|
| 3,830,452 | 8/1914 | Seay | 244/116 |
| 4,123,020 | 10/1978 | Korsak | 244/116 |
| 4,420,132 | 12/1983 | Martin | 244/115 |
| 4,786,014 | 11/1988 | Pesando et al. | 244/115 |

*Primary Examiner*—Edwin L. Swinehart

[57] ABSTRACT

There is provided aircraft securing apparatus for securing an aircraft against toppling on the deck of a ship or the like. The apparatus includes a rotatable arm pivotal in a plane substantially parallel to the deck to engage a downwardly-projecting probe of an aircraft. A releasable clamp is mounted on the arm and is adapted to be slidable from a stored position to a probe-engaging position, and a sensor is provided on the arm for sensing engagement of the probe by the arm and actuating locking of the clamp about the probe. A drive motor is provided for effecting rotation of the arm.

19 Claims, 2 Drawing Sheets

APPARATUS FOR CONTROLLING AIRCRAFT ON SHIPS OR THE LIKE

This is a continuation of application Ser. No. 07/699,845, filed May 14, 1991, now abandoned.

FIELD OF THE INVENTION

This invention relates to apparatus for controlling undesired movement of aircraft on board ship. In this connection, it is well-known that there is a difficulty in retaining a helicopter securely on the deck of a ship when the ship is subject to considerable movement from a horizontal plane particularly in rough sea states.

It is known practice for a helicopter to be fitted with a depending probe or decklock to assist with landing and securing the aircraft to a loading grid which is mounted in or on the flight deck of a ship. Once the helicopter has landed and been secured, it is then known for the helicopter to have a traversing system attached thereto so that the helicopter can be moved from its landing area into a hangar on the deck of a ship.

Prior to effecting this operation it is normally necessary to carry out a transitional phase to move the helicopter from its landed position on the flight deck to an intersection with an intended path of travel which will allow it to enter the hangar along a pre-determined path. In order to guide the helicopter along this intended path of travel the deck of the ship is provided with a track in the form of a guide rail along which a shuttle can be constrained to move into the hangar. By securing the helicopter at two points associated with the guide rail, it is ensured that the helicopter is moved along the desired path into the hangar in a restrained manner.

It will be appreciated that during this the transitional phase prior to engagement with the shuttle for movement into the hangar, the helicopter must be secured against toppling, sliding or the like.

An object of the present invention is to provide a means whereby a helicopter can be secured during its transitional phase.

SUMMARY OF THE INVENTION

According to the present invention there is provided aircraft securing apparatus for securing an aircraft against toppling on the deck of a ship or the like comprising a rotatable arm pivotal in a plane substantially parallel to said deck to engage a downwardly-projecting probe of an aircraft, a releasable clamp on said arm adapted to be slidable from a stored position to a probe-engaging position; sensor means on said arm for sensing engagement of the probe by the arm and actuating locking of the clamp about the probe; and drive means for effecting rotation of the arm.

Preferably, the sensor means is a touch bar housed for pivotal movement within a recess in the arm, said touch bar projecting in advance of the leading face of the arm during rotational movement thereof.

BRIEF DESCRIPTION OF THE DRAWINGS

An embodiment of the present invention will now be described, by way of example, with reference to the accompanying drawings, in which.

DETAILED DESCRIPTION OF THE DRAWINGS

Figures 2, 3:
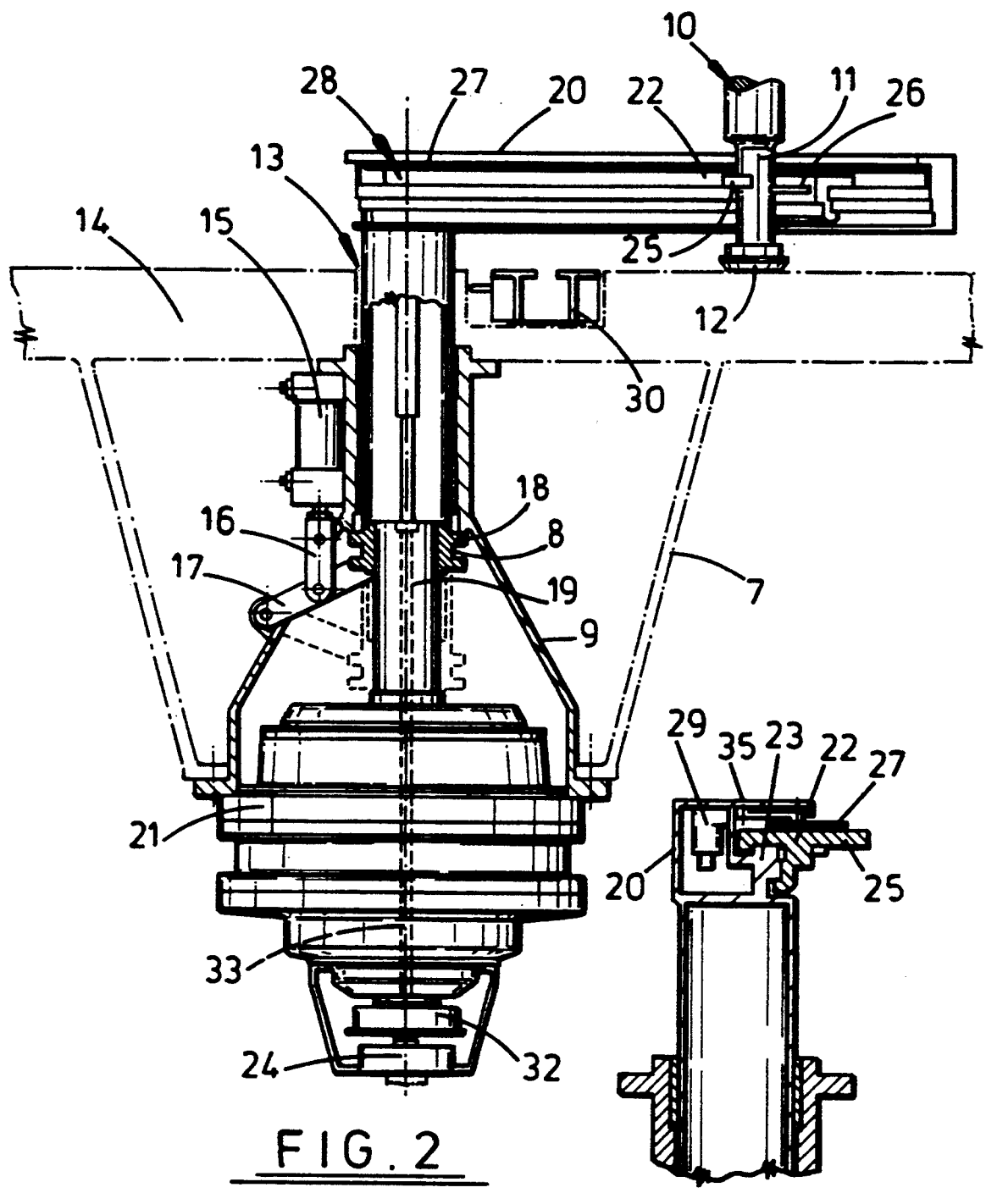
FIG. 2 is a vertical view partly in section of the apparatus of FIG. 1.
FIG. 3 is a fragmentary sectional view on the line 3—3 of FIG. 1.

Referring to the drawings, helicopter-securing apparatus is shown which is adapted to engage the lower end of a customary helicopter probe 10 and for mounting on the deck 14 of a ship as shown in dotted lines in FIG. 2. The apparatus includes a mounting frame 9 which is fixed to the structure of the ship 7. As seen best in FIG. 2, the free lower end of the probe 10 has an intermediate section 11 of reduced diameter terminating in an enlarged end portion 12.

The apparatus of the invention is, when out of use, located in a recess 13 in the deck 14 of the ship. By means of a retracting means, including an hydraulic piston and cylinder 15 mounted to the frame 9, the securing apparatus can be raised or lowered through an inter-connecting linkage mechanism comprising two pivotal members 16,17 and associated sleeve 18 which causes the apparatus to be raised or lowered out of or into its recess 13. The member 17 is pivotally connected to the frame 9 at one end and, at the other end engages an annular groove 8 in the sleeve, allowing rotation of the sleeve relative to the linkage mechanism. The sleeve 18 is slidably located in a tubular, upper portion of the frame 9 which also acts as a bearing for the sleeve.

As shown best in FIG. 2, the sleeve 18 is slidably mounted over a vertical pillar 19, and carries at its upper end a rotatable arm 20. The arm 20 is connected to the sleeve 18 at one end thereof and the sleeve and the arm can be rotated by means of an hydraulic motor 21, incorporating a motor brake, located below the deck of the ship on the frame 9. Within the arm 20 there is mounted a spring-loaded clamp 22, the clamp 22 being capable of sliding on a rail 23 (FIG. 3) under spring force radially outwards along one face of the arm 20, the spring force being applied by a tension spring motor 32 fixed below the hydraulic motor and from which a shaft 33 extends through the pillar 19 and sleeve 18. The clamp 22 can be reset to its radially inward position and the spring motor reset by a clamp resetting motor 24 located below the spring motor 32. The clamp 22 is normally in a storage position, as indicated by chain dotted lines 22a in FIG. 1.

Figure 1:
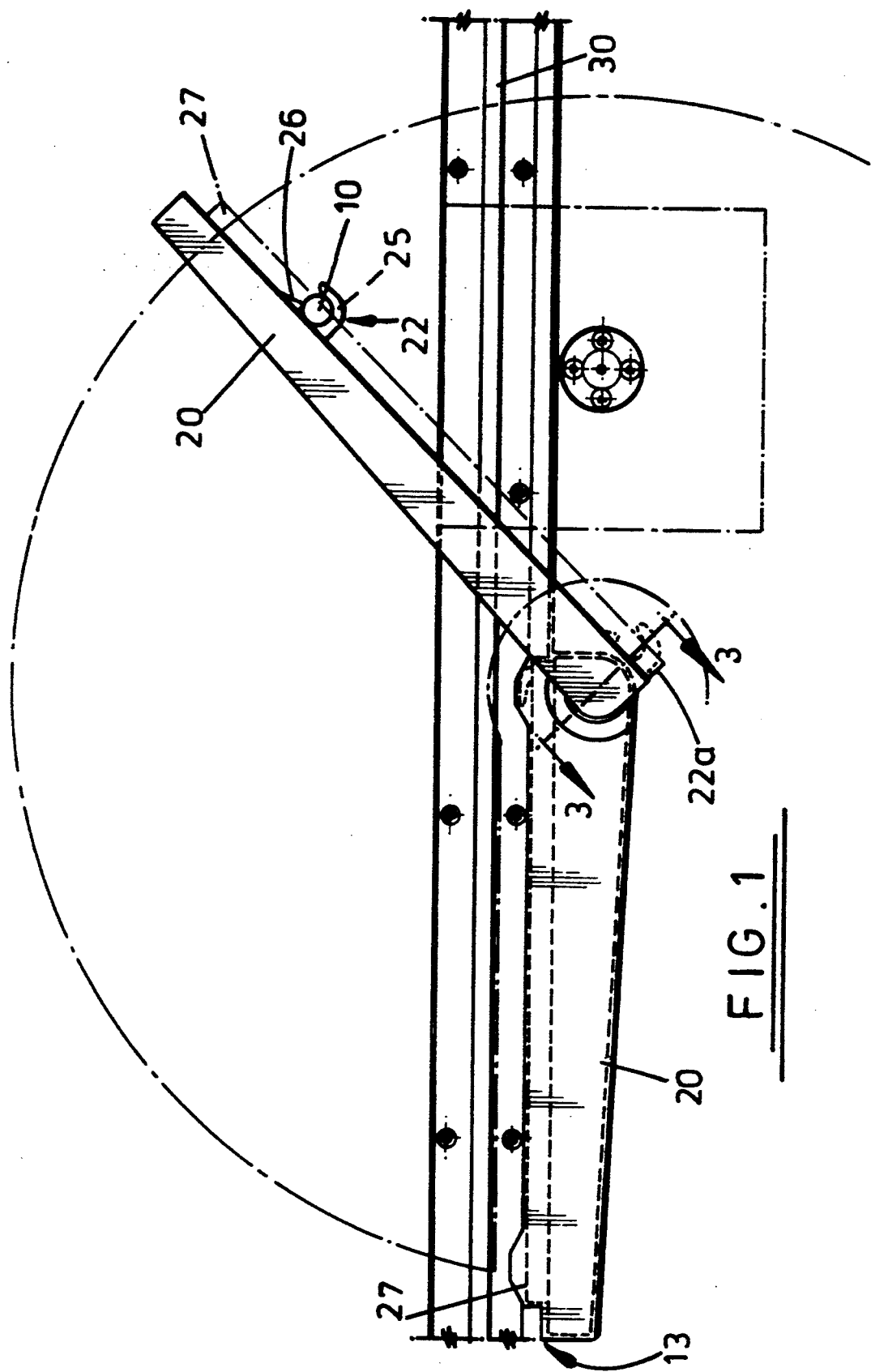
FIG. 1 is a diagrammatic view of helicopter-securing apparatus in accordance with the present invention.

As shown in FIG. 1, the clamp 22 comprises a hook element 25 projecting laterally of the arm and open at its forward end and associated with a spring-loaded latch 26. The arm 20 also houses a touch bar 27. The touch bar 27 which extends substantially the length of the arm 20, is housed within a recess 28 in the arm and is pivotal into the recess 28 against spring action about two parallel pivot arms 35 (only one shown in FIG. 3) into the recess 28. The touch bar 27 is also shown in the extended position in chain dotted outline in FIG. 1.

Operation of the securing apparatus described above will now be described.

On a helicopter landing on the flight deck of the ship, the helicopter probe 10 is urged into its extended condition against the deck under spring action. At this stage, the probe 10 of the helicopter is within the radius of a circle which can be circumscribed by the outward end of the arm 20. The cylinder 15 is then actuated to raise the securing apparatus from its recess 13 in the deck 14 of the ship so that the arm 20 is raised above the level of the deck and extends horizontally thereover as shown in FIG. 2. The hydraulic motor 21 is then actuated to rotate the arm 20 until the touch bar 27 on the leading face of the arm 20 contacts the probe 10 of the helicopter. On contacting the probe 10, the touch bar 27 is urged into its recess 28 in the arm 20 and this movement actuates a microswitch 29 (FIG. 3) which causes the hydraulic motor 21 to stop rotating the arm and to apply the motor brake. At the same time, the switch 29 actuates release of the clamp 22 which moves radially outwardly along the arm under spring action until it engages the probe 10 so that the probe 10 is located within the hook 25 of the clamp and retained therein by the releasable latch 26. The probe 10 and its helicopter are thus locked to the arm 20 so that the helicopter is restrained against toppling as the enlarged free end portion 12 cannot detach itself from the clamp. The arm 20 is now rotated once again by its hydraulic motor 21 to cause the aircraft probe 10 and its associated helicopter to move in a circular arc until it is arrested above the deck recess 13 when the probe 10 is on the centre line of its intended path of travel above a shuttle guide rail 30 (FIG. 2). The shuttle is then moved along the guide rail 30 to engage the probe and this action automatically engages the clamp latch 26 to release the clamp of the arm 20 thereby allowing the shuttle to move the probe 10 and helicopter away from the arm 20 along its intended path of travel on guide rail 30. The clamp resetting motor 24 is then actuated to return the clamp 22 to its radially inward position. The hydraulic cylinder 15 is actuated to lower the apparatus into its recess 13 so that the deck is once again unobstructed.

It will thus be noted that the above-described apparatus provides a relatively simple and secure means for securing an aircraft on the deck of a ship and then moving the aircraft to a position where the aircraft conveyor or shuttle may engage the probe.

It will be clear to those of skill in the art that the above described preferred embodiment is merely exemplary of the present invention and that various modifications and improvements may be made without departing from the scope and spirit of the invention.

I claim:

1. Aircraft securing apparatus for securing an aircraft against toppling on the deck of a ship comprising:
    a rotatable arm, rotatable about a fixed axis, for rotation in a plane substantially parallel to said deck to rotatably engage a downwardly projecting probe of an aircraft, said arm being mounted for rotation but not translation in said plane with respect to said axis;
    a releasable clamp on said arm for clamping onto said probe, said clamp slidable from a stored position to a plurality of probe-clamping positions relative to said rotatable arm;
    means disposed on said arm for sensing engagement of the probe with the arm and for actuating said clamp for movement to any one of said plurality of probe clamping positions; and
    drive means for rotating the arm to rotatably engage said probe.

2. The aircraft securing apparatus of claim 1, wherein the sensor means actuates movements of the clamp from the stored position to the probe-engaging position.

3. The aircraft securing apparatus of claim 2, wherein the clamp comprises a hook element having an open forward end and projecting laterally of the arm, and a spring loaded latch for at least partially closing the forward end of the hook element.

4. The aircraft securing apparatus of claim 3, wherein the clamp is slidably mounted on a rail provided in the arm and spring means is provided to move the clamp from the stored position to the probe-engaging position and resetting means is provided to return the clamp to the stored position from the probe engaging position.

5. The aircraft securing apparatus of claim 4, wherein the spring means is in the form of a spring motor located about a vertical axis at the radially inward end of the arm and the setting means is in the form of a resetting motor also located about a vertical axis at the radially inward end of the arm.

6. The aircraft securing apparatus of claim 1, wherein the sensor means is a touch bar projecting in advance of a leading face of the arm during rotation movement thereof.

7. The aircraft securing apparatus of claim 6, wherein the touch bar extends along at least a substantial portion of the length of the arm.

8. The aircraft securing apparatus of claim 7, wherein the touch bar is housed within a recess in the arm.

9. The aircraft securing apparatus of claim 8, wherein the touch bar is pivotal into the recess.

10. The aircraft securing apparatus of claim 1, wherein the arm is vertically retractable for movement between a storage position substantially flush with the level of the deck and an operating position above the level of the deck and further comprising retracting means for raising and lowering the arm.

11. The aircraft securing apparatus of claim 10, in combination with the deck of a ship and wherein the deck is provided with a recess to accommodate the arm in the storage position.

12. The aircraft securing apparatus of claim 10, wherein the arm includes an arm mounting for mounting the apparatus to the deck of a ship, said arm mounting including a vertical pillar the arm including a corresponding sleeve in vertical sliding engagement with the pillar.

13. The aircraft securing apparatus of claim 12, wherein the retracting means is mounted to the arm mounting and the retracting means includes a linkage mechanism connected to the sleeve.

14. The aircraft securing apparatus of claim 13, wherein the sleeve is rotatable relative to the linkage mechanism.

15. The aircraft securing apparatus of claim 14, wherein the retracting means includes a hydraulic piston and cylinder mounted parallel to the axis of the rotation of the arm and pivotally attached to an intermediate portion of a member of the linkage mechanism, one end of the member pivotally connected to the arm mounting and the other end of the member provided means for engaging an annular groove in the sleeve.

16. The aircraft securing apparatus of claim 1, wherein the rotatable arm is pivotable through a 360° arc.

17. Aircraft securing apparatus for securely moving an aircraft from a landed position on a deck of a ship to an intersection with a track for an aircraft conveyor for engagement with the aircraft conveyor, the apparatus comprising:
    a mounting frame for securing the apparatus to the deck;
    a rotatable arm pivotally mounted to the mounting frame in a plane substantially parallel to said deck, for engaging a downwardly projecting probe of an aircraft and being vertically movably mounted to the mounting frame, wherein said rotatable arm moves between a storage position below a horizontal surface formed by the deck and an operating position above the horizontal surface formed by the deck;

means for raising and lowering the arm;

releasable clamp mounted on said arm and slidable from a stored position to a probe-engaging position;

means disposed on said arm for sensing engagement of the downwardly projecting probe with the arm and for actuating movement of the clamp along the arm from the storage position to engage the downwardly projecting probe and to lock the clamp about the downwardly projecting probe upon sensing said engagement; and drive means for rotating the arm to engage the downwardly projecting probe and then move the probe and associated aircraft in an arcuate path into a position where the probe intersects the aircraft conveyor track.

18. A method of securing an aircraft provided with a downwardly projecting probe against toppling on the deck of a ship including a guide rail comprising:

providing a deck area with a rotatable arm pivotal in a plane substantially parallel to the deck and having a releasable clamp slidable on the arm from a stored position to a probe engaging position and means for sensing engagement of the probe with the arm;

landing an aircraft on the deck in a location such that the probe will lie within an arc swept by the rotatable arm on rotation thereof;

rotating the arm to engage the probe;

sensing engagement of the probe with the arm by said sensing means;

actuating the clamp, in response to said sensing, to slide along the arm to engage the probe and lock about the probe; and rotating the arm and probe engaged therewith to move said probe and said aircraft in an arcuate path into position above said guide rail on said deck.

19. The method of claim 18, further comprising rotating the arm with the probe locked in the clamp to move the probe and the aircraft to another position on the deck.

* * * * *